United States Patent [19]

McConnell et al.

[11] 4,350,807

[45] Sep. 21, 1982

[54] COPOLYESTER COMPOSITIONS

[75] Inventors: Richard L. McConnell; Jimmy R. Trotter; Glenn C. Jones, all of Kingsport, Tenn.

[73] Assignee: Eastman Kodak Company, Rochester, N.Y.

[21] Appl. No.: 232,768

[22] Filed: Feb. 9, 1981

[51] Int. Cl.$^3$ .............................................. C08G 3/16
[52] U.S. Cl. .................................. 528/302; 156/332; 428/480; 528/272
[58] Field of Search ................ 528/272, 302; 156/332; 428/480

[56] References Cited

U.S. PATENT DOCUMENTS

| | | | |
|---|---|---|---|
| 2,363,581 | 11/1944 | Frosch | 528/302 |
| 2,402,137 | 6/1946 | Hanford et al. | 260/29.6 XA |
| 2,409,683 | 10/1946 | Howk et al. | 106/10 |
| 2,433,015 | 12/1947 | Roland et al. | 260/413 HC |
| 2,585,723 | 2/1952 | Banes et al. | 260/413 HC |
| 3,049,557 | 8/1962 | Emrick | 560/105 |
| 3,057,824 | 10/1962 | Le Bras et al. | 528/302 |
| 3,091,650 | 5/1963 | Emrick et al. | 585/942 |
| 3,100,792 | 8/1963 | Emrick | 568/904 |
| 4,252,940 | 2/1981 | Sublett | 528/302 |

Primary Examiner—Ronald W. Griffin
Attorney, Agent, or Firm—John F. Stevens; Daniel B. Reece, III

[57] ABSTRACT

Disclosed are copolyesters derived from 100 mole % of a dibasic acid component, at least 2 mole % of which is the reaction product of ethylene and at least one dialkyl ester of an aliphatic or cycloaliphatic dibasic acid, said dibasic acid containing from 3 to 22 carbon atoms and the alkyl groups of wich contain from 1 to 8 carbon atoms, and 100 mole % of at least one aliphatic or alicyclic glycol having 2 to 12 carbon atoms. These polyesters are useful as adhesives.

8 Claims, No Drawings

COPOLYESTER COMPOSITIONS

TECHNICAL FIELD

This invention relates to linear polyesters having ethylene telomers derived from dialkyl esters of dibasic acids as a part of their dibasic acid component.

Certain polyesters are known to be useful as adhesives for bonding fabrics and leather. It has now been found that certain crystallizable, linear, thermoplastic polyesters containing ethylene telomers derived from dialkyl esters of dibasic acid (ethylene telomer esters) have excellent adhesive properties for fabrics, metals, plastics, leather, and wood. Also, these polymers may be extrusion coated or applied from solutions to provide coatings for fabrics, metals, plastics, leather, and wood.

These new polyesters generally contain crystallizable moieties with crystalline melting points up to about 200° C. They contain one or more ethylene telomer esters which are chemically combined in the polyester molecule. Certain viscous noncrystallizable polyesters based on the ethylene telomer esters are also useful materials. For example, the viscous noncrystallizable polyesters may be diluted with xylene and reacted with reagents such as hexamethoxymethylmelamine to form high solids coatings or paints. Pigments and fillers are generally used in these coatings and paints.

BACKGROUND

Patents of interest in connection with telomers include U.S. Pat. Nos. 3,049,557; 3,100,792; 3,091,650; 2,402,137; 2,433,015; 2,585,723; and 2,409,683.

DISCLOSURE OF INVENTION

According to the present invention, copolyesters are provided which are useful as protective coatings or adhesives for bonding fabrics, metals, plastics, wood and the like. The copolyesters are derived from 100 mole percent of a dibasic acid component and 100 mole percent of a glycol component.

The dibasic acid component of the copolyesters of this invention contains at least 2 mole percent of a telomer, i.e., the reaction product of ethylene and at least one dialkyl ester of an aliphatic or cycloaliphatic dibasic acid. The dibasic acid from which the telomer is derived contains from 3 to 22 carbon atoms, and the alkyl groups contain from 1 to 8 carbon atoms each. The dibasic acid component may contain up to 100 mole percent of the telomer. It is preferred that the dibasic acid component contain at least three mole percent of the telomer.

The production of telomers by reaction of ethylene and a dialkyl ester of a dibasic acid preferably containing only carbon, hydrogen, and oxygen, is well known in the art. In preparing the telomers, the ethylene, designated as the taxogen, is polymerized in the presence of the diester, or telogen. The reaction proceeds in the presence of a compound designated as a free radical initiator. This compound, usually an organic peroxide, dissociates into radicals which act to abstract an active, or labile, hydrogen atom from the telogen. The resulting radical adds to the double bond of the taxogen thereby initiating the telomerization reaction. Thus, the telogen radical and the active hydrogen form the terminal groups on the polymeric chain. The reaction can be defined by the following equation:

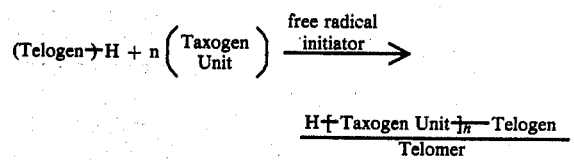

Telomers are not to be confused with interpolymers and/or copolymers. The fragments of the telogen monomer appear only at the terminal ends of the polymeric chain, thus forming a low molecular weight product. In contrast, the monomeric units in interpolymers and/or copolymers occur within each polymeric chain thus forming an integral part of the backbone of the polymer.

The telomers are formed by the reaction of ethylene with a dialkyl ester of a dicarboxylic acid in the presence of a free radical initiator, at temperatures between 50° and 400° C., and at pressures up to 30,000 psi.

The telogens used in preparing the telomers are dialkyl esters of dibasic acids having from 3 to 22 carbon atoms. The alkyl groups containing from 1 to 8 carbon atoms. Preferred dialkyl esters include dimethyl 1,4-cyclohexanedicarboxylate, dimethyl 1,3-cyclohexanedicarboxylate, dimethyl glutarate, dimethyl adipate, dimethyl azelate, dimethyl 1,12-dodecanedioate and the like. Although dimethyl esters are most preferred, other esters such as the ethyl, propyl and butyl are also preferred.

In the production of the telomers, temperatures of about 50° to about 400° C. are generally used, with the preferred temperature range being from about 150° to about 300° C. The temperature utilized is somewhat variable in relation to the pressure and contact time employed. Generally, very good results are obtained by maintaining the pressure at about 10 to 2000 atmospheres or higher and heating the reactants at about 160° C. for two to three hours. When low ethylene pressures are used, reaction pressure may be maintained by the use of an inert gas such as nitrogen.

Free radical initiators which may be used in the reaction include peroxides such as diacetyl peroxide, dipropionyl peroxide, acetyl benzoyl peroxide, benzoyl peroxide, di-tert-butyl peroxide; tert.-butyl hydroperoxide, tert.-butyl perbenzoate, tert.-butyl peroxy acetate, hydrogen peroxide, and tert.-butyl percarbonate.

The preferred free radical initiator for use in preparing the telomers of the instant invention is di-tert-butyl peroxide.

The telomers will vary with the reaction conditions, i.e., the amount of ethylene utilized, the amount of free radical initiator available, and variance in the temperature and pressure employed.

The polyesters of this invention may also contain up to about 98 mole % of aromatic, cycloaliphatic, or aliphatic dibasic acids having 4 to 36 carbon atoms, and they contain one or more aliphatic or cycloaliphatic glycols having 2 to 12 carbon atoms. Suitable dibasic acids include terephthalic, isophthalic, 5-sulfoisophthalic (the sulfonic acid group is neutralized with an alkali metal), 1,4-cyclohexanedicarboxylic, 1,3-cyclohexanedicarboxylic, 1,2-cyclohexanedicarboxylic, succinic, glutaric, adipic, pimelic, suberic, azelaic, sebacic, 1,12-dodecanedioic, dimer acid, and the like. These dibasic acids may be used as the free acid or as alkyl esters in the preparation of the polyesters. Useful glycols include ethylene glycol, propylene glycol, 1,3- propanediol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, and the like.

These new copolyesters are readily prepared using typical polycondensation reaction conditions. They may be prepared by either batch or continuous processes.

Typical polyesterification catalysts which may be used include titanium alkoxides, dibutyl tin dilaurate, and combinations of zinc, manganese or magnesium acetates or benzoates with antimony oxide or antimony triacetate.

Useful polymers may have inherent viscosities (I.V.) ranging from about 0.1 to about 1.6, but preferred polymers have I.V. values ranging from about 0.2 to about 1.5.

These polyesters have crystalline melting points of less than 200° C.

One of the advantages of the crystallizable polyesters is that they can be used to bond fabrics at relatively low temperatures and the bonded fabrics have good resistance to typical laundering procedures. The polymers may be used in powder form for fusible interlining fabrics, applied in hot-melt form from extruders or gear pump applicators, or extruded into film form for use in laminating or bonding substrates. The polymers may also be melt blown into nonwoven webs which may be used to laminate fabrics or other articles.

The following examples are submitted for a better understanding of the invention.

EXAMPLE 1

To a one-gallon stirred autoclave is charged 1800 g. (9 mole) dimethyl cyclohexane-1,4-dicarboxylate (cis and trans mixture) and 36 g. (0.27 mole) di-tert-butyl peroxide. The autoclave is purged with nitrogen, and the temperature is raised to 70° C. The solution is gently stirred for 30 min. to insure the reactants are well mixed. Ethylene (650 psi) is added and the temperature raised to 160° C. over a two-hour period. The ethylene pressure is maintained at 650 psi for three hours at 160° C. The reaction product is filtered to remove unchanged dimethyl cyclohexane-1,4-dicarboxylate. The lower boiling material is removed by distillation at a pressure of 1 mm until a base temperature of 225° C. and a head temperature of 180° C. is obtained. The remaining material (224 g.) has a number average molecular weight of 610 as determined by the boiling point elevation method.

EXAMPLE 2

To a one liter stirred autoclave is charged 451 g. (2.8 mole) dimethyl glutarate and 12.5 g. (0.085 mole) di-tert-butyl peroxide. After the autoclave is purged with nitrogen, 650 psi ethylene is added and the temperature raised to 160° C. The ethylene pressure is maintained for three hours. The lower boiling material is removed from the product by distillation at 1.2 mm until a base temperature of 230° C. and a head temperature of 187° C. is obtained. The remaining material (55 g.) has a number average molecular weight of 728 as determined by the boiling point elevation method.

EXAMPLE 3

A total of 76.25 grams (0.125 mole) of dimethyl 1,4-cyclohexanedicarboxylate ethylene telomer (molecular weight=610), 15.5 grams (0.25 mole) of ethylene glycol, and 200 ppm of titanium catalyst [2.35 ml of titanium isopropoxide catalyst solution in n-butanol (0.65 wt % titanium)] are weighed into a 250-ml single-neck round-bottom flask equipped with a nitrogen inlet, stirrer, vacuum outlet, and a condensing flask. The flask is heated at 200° C. in a Belmont metal bath for one hour with a nitrogen sweep over the reaction mixture. After one hour, the temperature of the bath is increased to 210° C. for one hour. When the theoretical amount of methanol has distilled from the reaction mixture, the metal bath temperature is increased to 275° C. and the pressure in the flask is reduced to about 0.1-0.5 mm of mercury. The flask is heated at 275° C. at 0.35 mm pressure for 20 minutes. The flask is then removed from the bath and is allowed to cool under a nitrogen atmosphere. The resulting product is a viscous liquid at 23° C.

EXAMPLE 4

A total of 87.3 grams (0.45 mole) of dimethyl terephthalate, 30.5 grams (0.05 mole) of dimethyl cyclohexanedicarboxylate-ethylene telomer (610 molecular weight), 80.24 grams (0.68 mole) of 1,6-hexanediol, 28.8 grams (0.32 mole) of 1,4-butanediol, and 100 ppm titanium catalyst [2.51 ml of titanium isopropoxide catalyst solution in n-butanol (0.65 wt % titanium)] are weighed into a 500-ml single-neck round-bottom flask equipped with a nitrogen inlet, stirrer, vacuum outlet, and a condensing flask. The flask is heated at 200° C. in a Belmont metal bath for one hour with a nitrogen sweep over the reaction mixture. After an hour, the temperature is increased to 210° C. for one hour. When the theoretical amount of methanol has distilled from the reaction mixture, the metal bath temperature is increased to 250° C. and the pressure in the flask is reduced to about 0.1-0.5 mm of mercury. The flask is heated at 250° C. at about 0.2 mm pressure for one hour. The flask is then removed from the bath and is allowed to cool under a nitrogen atmosphere as the polyester crystallizes.

NMR analysis of the polymer indicates it to be a poly(hexamethylene terephthalate) copolyester containing 20 mole % 1,4-butanediol and 7 mole % of dimethyl cyclohexanedicarboxylate ethylene telomer.

The polymer is an opaque, white color. It has an I.V. of 0.48 and a melt viscosity of 15,325 cp at 190° C. (by ASTM D1238 method). By DSC analysis, the polymer has a Tg of 3° C. and a Tm of 110° C. ($\Delta H_f = 7.5$ cal/g).

The above material is readily dissolved in methylene chloride. Films (3-4 mils when dry) of the material are cast from the methylene chloride solution. The films are white and opaque and are flexible. The films are used to bond 65/35 polyester/cotton fabric (twill weave) using a Sentinel heat sealer at 130° C. and 15 psi for four seconds. The bonded specimens have a T-peel strength of 10.3 pounds/inch-width [measured at 23° C. (after bonds have aged 24 hours at 23° C.) using a peel rate of two inches per minute].

EXAMPLE 5

A total of 36.4 grams (0.05 mole) of dimethyl glutarate-ethylene telomer (molecular weight=728), 6.2 grams (0.1 mole) of ethylene glycol, and 100 ppm of titanium catalyst [0.56 ml of titanium isopropoxide catalyst solution in n-butanol (0.65 wt. % titanium)] are weighed into a 250-ml single-neck round-bottom flask equipped with a nitrogen inlet, stirrer, vacuum outlet, and a condensing flask. The flask is heated at 200° C. in a Belmont metal bath for one hour with a nitrogen sweep over the reaction mixture. After one hour, the temperature of the bath is increased to 210° C. for one hour. When the theoretical amount of methanol has distilled from the reaction mixture, the metal bath temperature is increased to 275° C. and the pressure in the flask is reduced to about 0.1–0.5 mm of mercury. The flask is heated at 275° C. at 0.2 mm pressure for 20 minutes. The flask is then removed from the bath and is allowed to cool under a nitrogen atmosphere. The resulting product is a viscous liquid at 23° C.

EXAMPLE 6

The general procedure of Example 4 is repeated except that dimethyl terephthalate, dimethyl adipate, dimethyl 1,4-cyclohexanedicarboxylate-ethylene telomer (molecular weight=610), ethylene glycol, and 1,4-butanediol are used to make a poly(ethylene terephthalate) copolyester containing 23 mole % adipic acid, 3 mole % of 1,4-cyclohexanedicarboxylic acid-ethylene telomer, and 25 mole % 1,4-butanediol. This copolyester has an I.V. of 0.79 and a DSC melting point of 143° C.

Similarly good results are achieved when a dimethyl azelate-ethylene telomer is used instead of the dimethyl 1,4-cyclohexanedicarboxylate-ethylene telomer.

EXAMPLE 7

The general procedure of Example 4 is repeated except that dimethyl terephthalate, isophthalic acid, dimethyl sebacate-ethylene telomer (molecular weight=790), 1,6-hexanediol, and 1,4-butanediol are used to make a poly(hexamethylene terephthalate) containing 21 mole % isophthalic acid, 9 mole % sebacic acid-ethylene telomer, and 20 mole % 1,4-butanediol. This copolyester has an I.V. of 0.71 and a DSC melting point of 82° C.

Similarly good results are achieved when diethylene glycol is used instead of 1,4-butanediol.

Unless otherwise specified, all parts, percentages, ratios, etc., are by weight.

The term "polyester" is used herein in a generic sense to include copolyesters.

Although not required in the practice of this invention, small amounts of stabilizers, pigments, colorants, anticaking agents, fluorescent agents or other additives normally used in fusible interlining applications may be used if desired.

Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

Melting points (TM) of the polymers are obtained using Differential Scanning Calorimeters.

The "heat of fusion", $\Delta H_f$, of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

The invention has been described in detail with particular reference to preferred embodiments thereof, but it will be understood that variations and modifications can be effected within the spirit and scope of the invention.

We claim:

1. Copolyester derived from
   (a) 100 mole % of a dibasic acid component, at least 2 mole % of which is an ethylene telomer ester of ethylene and at least one dialkyl ester of an aliphatic or cycloaliphatic dibasic acid, said dibasic acid containing from 3 to 22 carbon atoms and the alkyl groups of which contain from 1 to 8 carbon atoms, and
   (b) 100 mole % of at least one aliphatic or alicyclic glycol having 2 to 12 carbon atoms,
   said copolyester having a crystalline melting point of less than 200° C.

2. Copolyester according to claim 1 comprising from 2 mole % to about 99.5 mole % of said reaction product and from about 98 to about 0.5 mole % of an aromatic, aliphatic or cycloaliphatic dibasic acid having from 4 to 36 carbon atoms.

3. Copolyester according to claim 1 wherein the I.V. is from about 0.1 to about 1.6.

4. Copolyester derived from
   (a) 100 mole % of a dibasic acid component, from 3 to about 99.5 mole % of which is an ethylene telomer ester of ethylene and at least one dialkyl ester of an aliphatic or cycloaliphatic dibasic acid, said dibasic acid containing from 3 to 22 carbon atoms and the alkyl groups of which contain from 1 to 8 carbon atoms, and from about 97 to about 0.5 mole % which is an aromatic, aliphatic or cycloaliphatic dibasic acid having from 4 to 36 carbon atoms, and
   (b) 100 mole % of at least one aliphatic or alicyclic glycol having 2 to 12 carbon atoms,
   said copolyester having a crystalline melting point of less than 200° C.

5. Adhesive composition comprising the copolyester of claim 1.

6. Adhesive composition comprising the copolyester of claim 4.

7. Substrate material having a coating thereon comprising the copolyester of claim 1.

8. Substrate material having a coating thereon comprising the copolyester of claim 4.

* * * * *